(12) United States Patent
Shore

(10) Patent No.: US 11,195,375 B2
(45) Date of Patent: *Dec. 7, 2021

(54) COMPUTER PROGRAM, METHOD, AND SYSTEM FOR PROVIDING REDEEMABLE PROMOTIONAL-VALUED CREDITS

(71) Applicant: 613 Ventures, LLC, Beverly Hills, CA (US)

(72) Inventor: Barry Shore, Venice, CA (US)

(73) Assignee: 613 Ventures, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,022

(22) Filed: Apr. 8, 2020

(65) Prior Publication Data

US 2020/0234539 A1 Jul. 23, 2020

Related U.S. Application Data

(63) Continuation of application No. 15/586,476, filed on May 4, 2017, now Pat. No. 10,650,636, which is a
(Continued)

(51) Int. Cl.
*G07F 17/32* (2006.01)
*G06Q 20/06* (2012.01)
(Continued)

(52) U.S. Cl.
CPC ....... *G07F 17/3255* (2013.01); *G06Q 20/065* (2013.01); *G06Q 20/387* (2013.01); *G06Q 30/0209* (2013.01); *G06Q 30/0233* (2013.01); *G06Q 30/0277* (2013.01); *G06Q 30/06* (2013.01); *G07F 17/3244* (2013.01)

(58) Field of Classification Search
CPC ............ G07F 17/3255; G07F 17/3244; G06Q 20/065; G06Q 20/387; G06Q 30/0209; G06Q 30/0233; G06Q 30/0277; G06Q 30/06
See application file for complete search history.

(56) References Cited

U.S. PATENT DOCUMENTS

| | | | |
|---|---|---|---|
| 7,006,993 B1 * | 2/2006 | Cheong | G06Q 20/02 705/35 |
| 2002/0112236 A1 * | 8/2002 | Sukeda | A63F 13/48 725/25 |

(Continued)

*Primary Examiner* — Tramar Harper
(74) *Attorney, Agent, or Firm* — Erise IP, P.A.

(57) ABSTRACT

An ecommerce platform, available via an interactive electronic resource, allows a user to purchase products and services from the resource, receive promotional-valued credits in return for the purchase, and play games to earn additional promotional-valued credits. The user can purchase products and services at the electronic resource with either or both of a government-issued legal tender, such as the U.S. dollar, or a virtual currency used by the electronic resource, such as the promotional-valued credits. In embodiments of the invention, the user is guaranteed that an amount of legal tender (e.g., the U.S. dollar) paid-in to the ecommerce platform is the same as or less than a fair market value of the products or services purchased via the ecommerce platform.

20 Claims, 7 Drawing Sheets

Related U.S. Application Data continuation of application No. 14/085,348, filed on Nov. 20, 2013, now Pat. No. 9,646,461.

(60) Provisional application No. 61/728,501, filed on Nov. 20, 2012.

(51) Int. Cl.
*G06Q 20/38* (2012.01)
*G06Q 30/06* (2012.01)
*G06Q 30/02* (2012.01)

(56) References Cited

U.S. PATENT DOCUMENTS

| | | | | |
|---|---|---|---|---|
| 2003/0203754 A1* | 10/2003 | Fujimoto | ............ | G06Q 20/387 463/25 |
| 2004/0193489 A1* | 9/2004 | Boyd | ................ | G06Q 30/0225 713/176 |
| 2009/0265233 A1* | 10/2009 | Sendo | ................ | G06Q 30/0239 705/14.39 |
| 2009/0287570 A1* | 11/2009 | Adamousky | ....... | G06Q 30/0601 705/14.54 |
| 2010/0169188 A1* | 7/2010 | Buchheit | ................. | G07F 17/32 705/26.1 |
| 2010/0227675 A1* | 9/2010 | Luxton | ............... | G07F 17/3272 463/25 |
| 2010/0299194 A1* | 11/2010 | Snyder | ............... | G06Q 30/0211 705/14.13 |
| 2011/0086712 A1* | 4/2011 | Cargill | .................... | A63F 13/79 463/42 |
| 2011/0312423 A1* | 12/2011 | Mosites | ............. | G06Q 30/0209 463/42 |
| 2012/0047008 A1* | 2/2012 | Alhadeff | ........... | G06Q 30/0214 705/14.16 |
| 2012/0226616 A1* | 9/2012 | Amar | ..................... | G06Q 30/02 705/50 |
| 2013/0041774 A1* | 2/2013 | Emura | ............... | G06Q 30/0251 705/26.7 |

* cited by examiner

COMPUTER PROGRAM, METHOD, AND SYSTEM FOR PROVIDING REDEEMABLE PROMOTIONAL-VALUED CREDITS

RELATED APPLICATION

The present application is a continuation application, and claims priority benefit with regard to common subject matter, of U.S. patent application Ser. No. 15/586,476, filed May 4, 2017, and entitled "COMPUTER PROGRAM, METHOD, AND SYSTEM FOR PROVIDING REDEEMABLE PROMOTIONAL-VALUED CREDITS," ("the '476 application"). The 476 application is a continuation application, and claims priority benefit with regard to common subject matter, of U.S. patent application Ser. No. 14/085,348, filed Nov. 20, 2013, and entitled "COMPUTER PROGRAM, METHOD, AND SYSTEM FOR PROVIDING REDEEMABLE PROMOTIONAL-VALUED CREDITS," which is now U.S. Pat. No. 9,646,461, issued May 9, 2017, ("the '461 patent"). The '461 patent is a non-provisional application and claims priority benefit, with regard to all common subject matter, of earlier-filed U.S. Provisional Patent Application No. 61/728,501, filed Nov. 20, 2012, and entitled "COMPUTER PROGRAM, METHOD, AND SYSTEM FOR PROVIDING REDEEMABLE PROMOTIONAL VALUED PRODUCTS." The identified earlier-filed patent and provisional application are hereby incorporated by reference into the present application in their entirety.

BACKGROUND

1. Field

Embodiments of the invention are directed to a computer program, method, and system for providing no-cost promotional-valued credits to a user that the user may in turn redeem for products or services. More particularly, embodiments of the invention provide an interactive electronic resource for purchasing products or services and for awarding and redeeming promotional-valued products in association with the purchase of the products or services, thereby eliminating any monetary risk to a user.

2. Related Art

To increase ongoing engagement with corporate brands, many gaming websites utilize promotional credits as a currency for the games. Some gaming websites also provide additional promotional credits to users for taking action with advertisements displayed on the website during the game or for referring new users to the website. Once a user has accumulated a specified amount of promotional credits, the user can redeem the credits for corporate-branded products or services.

A disadvantage of typical gaming websites is that the promotional credits cost the user a significant amount of money, such that a great majority of users lose money during their interaction with the websites. As the user loses money, they are less likely to make repeat purchases from the websites. An additional issue thwarting frequent usage of gaming websites is that the user must generally accumulate a substantial amount of credits before they qualify for redeeming the credits for products.

SUMMARY

This summary is provided to introduce a selection of concepts in a simplified form that is further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

Embodiments of the invention provide an ecommerce platform, available via an interactive electronic resource, that allows a user to purchase products or services from the resource, receive promotional-valued credits in return for the purchase, play games to earn additional promotional-valued credits, and redeem earned promotional-valued credits for additional products or services. The user can purchase products or services at the electronic resource with either or both of a government-issued legal tender, such as the U.S. dollar, or a virtual currency used by the electronic resource, such as the promotional-valued credits. In embodiments of the invention, the user is guaranteed that an amount of legal tender (e.g., the U.S. dollar) paid-in to the ecommerce platform is the same as or less than a fair market value of the products or services purchased via the ecommerce platform.

A computer program, method, and system of embodiments of the invention broadly comprises the steps of providing the electronic resource accessible by the user; receiving user information from the user, wherein the user information is associated with an account for the user accessible at the electronic resource; presenting, via the electronic resource and to the user, at least one product or service available for purchase by the user, wherein each product or service is associated with a purchase amount representing a cost to purchase the product or service, and an award amount representing an award provided to the user for purchasing the product or service, and wherein the award amount corresponds to a first amount of promotional-valued credits; receiving, via the electronic resource and from the user, a selection of the at least one product or service that the user desires to purchase; awarding the user the award amount representing the award provided to the user for purchasing the product or service and corresponding to the first amount of promotional-valued credits; providing, via the electronic resource and to the user, at least one game that the user may play, wherein the user must exchange a second amount of promotional-valued credits to play the game; allowing the user to play the at least one game in exchange for the user providing the second amount of promotional-valued credits to play the game, wherein play of the game results in an outcome; and awarding the user a third amount of promotional-valued credits based on the outcome of the user's play of the game.

BRIEF DESCRIPTION OF THE DRAWINGS

Embodiments of the present invention are described in detail below with reference to the attached drawing figures, wherein.

Figure 1:
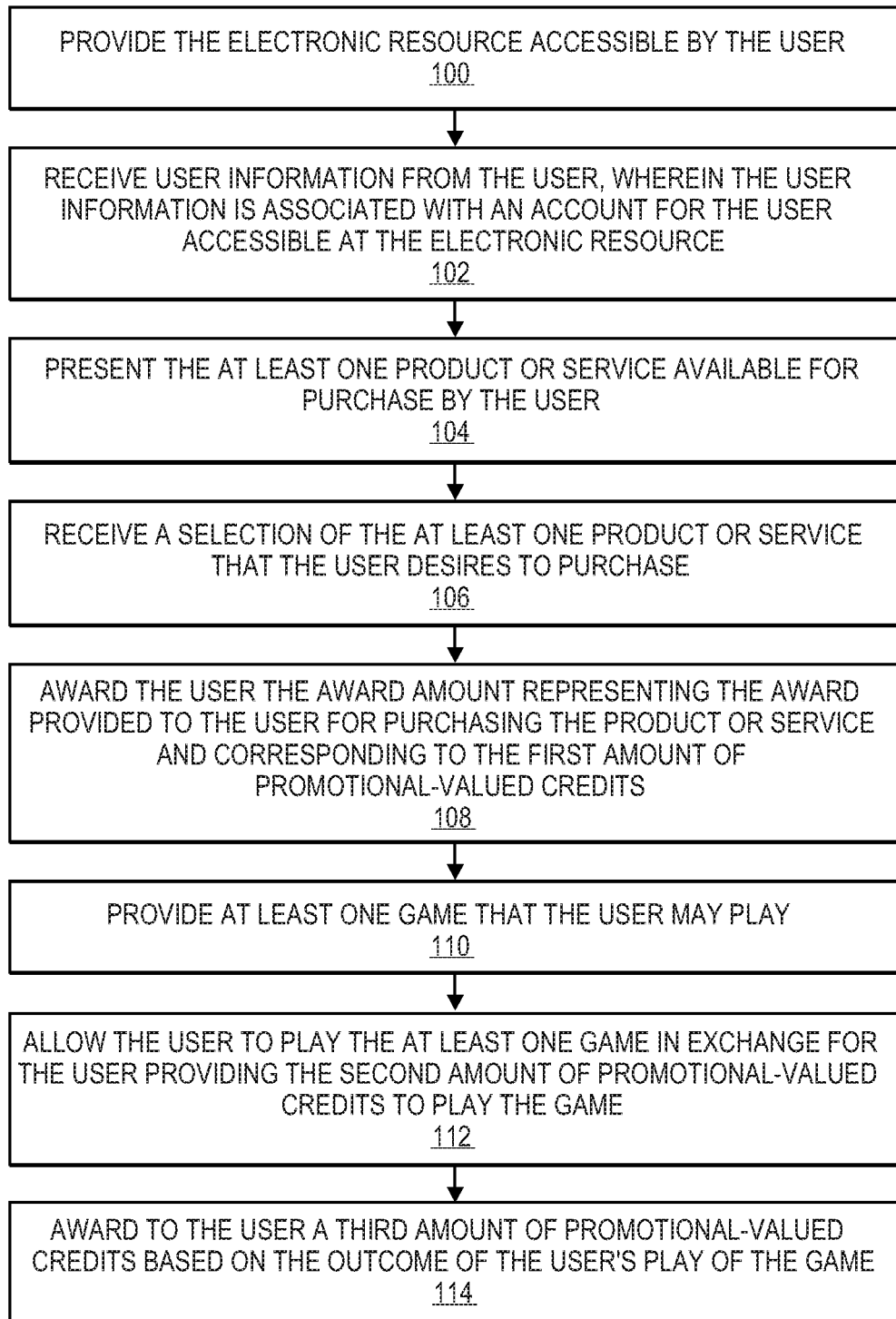
FIG. 1 is a flow chart illustrating a plurality of steps implemented by the computer program, method, and system of embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the invention provide a computer program, a method, and a system by which a user can purchase a product or service and play a game via an electronic resource, such as an online resource or mobile application. Embodiments of the invention allow the user to purchase a first product or service, play the game, and in some instances purchase additional products or services, without losing either of a net amount of money paid by the user to an administrator of the electronic resource for the first product or service or a fair market value for the first product or service. In response to the user's purchase of the first product or service, the user is credited with a first amount of promotional-valued credits. Moreover, based on an outcome of the user's play of the game, the user (and specifically, an account associated with the user) will be credited or debited with promotional-valued credits. The user can purchase additional products or services and/or play games available for play at the electronic resource using the promotional-valued credits earned from prior purchases of products or services and prior play of at least one game. Thus, the invention provides the user with a purchase and play experience that is either a net equal or a net gain of the fair market value of the purchased products or services as compared to the amount of money paid by the user to the administrator of the electronic resource. In embodiments, the user is guaranteed not to lose money paid to the administrator. Reference herein to a net equal or a net gain or the act of not losing money is intended to encompass the state where the money paid by the user to the electronic resource is the same or less than the fair market value of the products or services the user purchases at the electronic resource.

Embodiments of the invention include a computer program that performs a plurality of steps and a method that performs the steps. Reference to performed steps is intended to encompass the computer program performing the steps and a method of performing the steps.

Embodiments of the invention broadly comprise the steps of providing the electronic resource accessible by the user; receiving user information from the user, wherein the user information is associated with an account for the user accessible at the electronic resource; presenting, via the electronic resource and to the user, at least one product or service available for purchase by the user, wherein each product or service is associated with a purchase amount representing a cost to purchase the product or service, and an award amount representing an award provided to the user for purchasing the product or service, and wherein the award amount corresponds to a first amount of promotional-valued credits; receiving, via the electronic resource and from the user, a selection of the at least one product or service that the user desires to purchase; awarding the user the award amount representing the award provided to the user for purchasing the product or service and corresponding to the first amount of promotional-valued credits; providing, via the electronic resource and to the user, at least one game that the user may play, wherein the user must exchange a second amount of promotional-valued credits to play the game; allowing the user to play the at least one game in exchange for the user providing the second amount of promotional-valued credits to play the game, wherein play of the game results in an outcome; and awarding the user a third amount of promotional-valued credits based on the outcome of the user's play of the game.

System Description

The system of embodiments of the present invention may comprise computing devices, servers, and communications networks to facilitate the functions and features described herein. The computing devices and servers may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system. In various embodiments of the invention, the computing devices may comprise a memory element, a communication component, a display, and/or a user interface.

The computer program of embodiments of the present invention comprises a plurality of code segments executable by a computing device for performing the steps of the method of the present invention. The steps of the method may be performed in the order shown in FIG. 1, or they may be performed in a different order, unless otherwise expressly stated. Furthermore, some steps may be performed concurrently as opposed to sequentially. Also, some steps may be optional.

Figure 2:
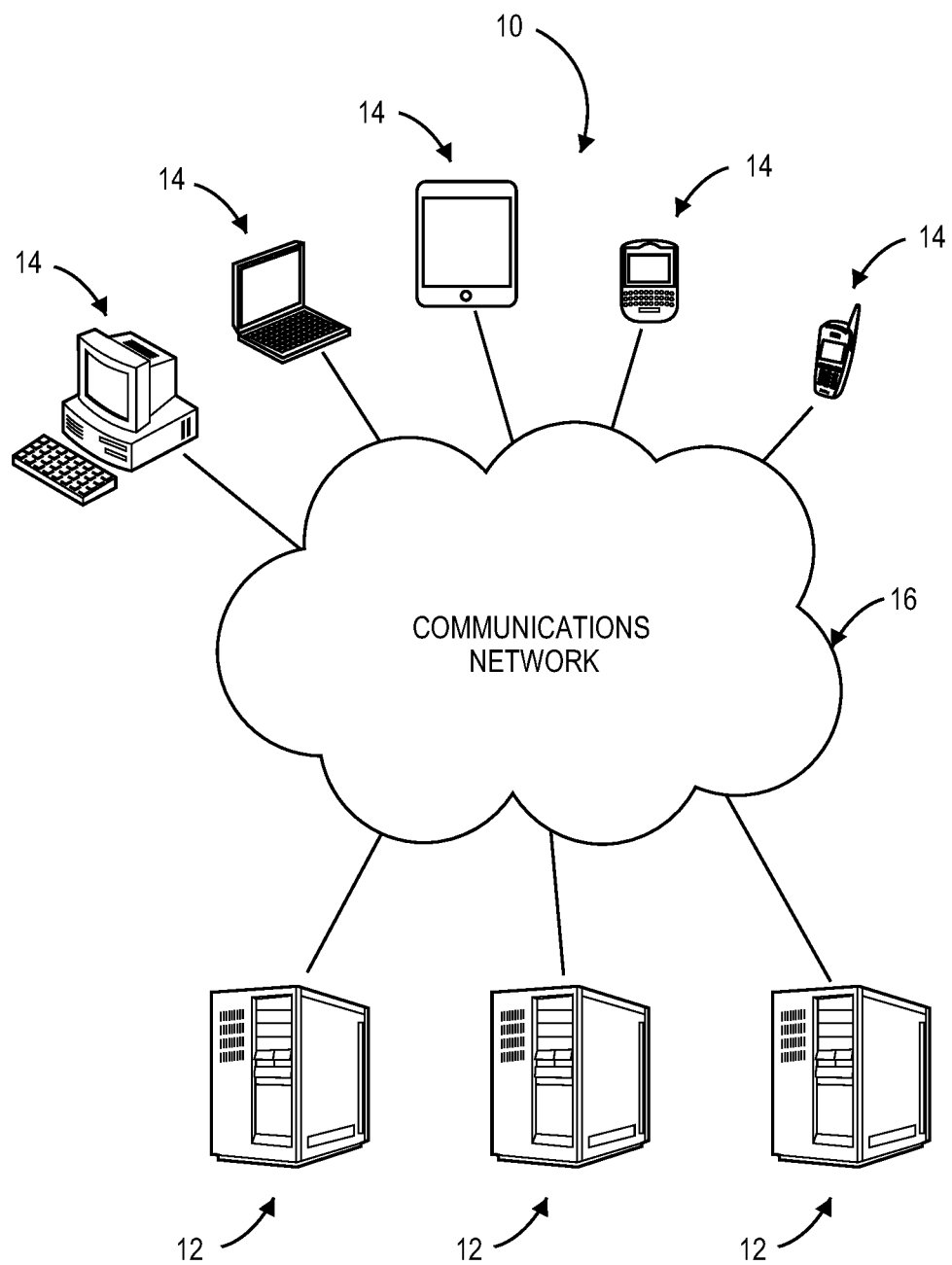
FIG. 2 is a block diagram illustrating components for implementing embodiments of the invention.

The computer program, method, and system of embodiments of the invention may be implemented in hardware, software, firmware, or combinations thereof using system 10, shown in FIG. 2, which broadly comprises server devices 12, computing devices 14, and a communications network 16. The server devices 12 may include computing devices that provide access to one or more general computing resources, such as Internet services, electronic mail services, data transfer services, and the like. The server devices 12 may also provide access to one or more databases, including a user database that stores information particular to each user that accesses the online resource described herein, a brand owner database that includes information for brand owners providing the products or services available for purchase at the electronic resource, and a games database that provides a plurality of games for playing at the electronic resource. The databases may also store other information and data necessary for the implementation of the computer program, method, and embodiments of the invention.

The server devices 12 and computing devices 14 may include any device, component, or equipment with a processing element and associated memory elements. The processing element may implement operating systems and may be capable of executing the computer program, which is also generally known as instructions, commands, software code, executables, applications, apps, and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable medium" or "computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices 12 may further include file stores comprising a plurality of hard disk drives, network attached storage, or a separate storage network.

The computing devices 14 may specifically include mobile communication devices (including wireless devices), work stations, desktop computers, laptop computers, palmtop computers, tablet computers, portable digital assistants (PDA), smart phones, scanners, cash registers, cash drawers, printers, and the like, or combinations thereof. Various embodiments of the computing device 14 may also include voice communication devices, such as cell phones or landline phones. In embodiments, the computing device 14 will have an electronic display, such as a cathode ray tube, liquid crystal display, plasma, or touch screen that is operable to display visual graphics, images, text, etc. In certain embodiments, the computer program of the invention facilitates interaction and communication through a graphical user interface (GUI) that is displayed via the electronic display. The GUI enables users (i.e., the consumer, a financial institution representative, or an administrator) to interact with the electronic display by touching or pointing at display areas to provide information to the user control interface. In additional embodiments, the computing device 14 may include an optical device such as a digital camera, video camera, optical canner, or the like, such that the computing device can capture, store, and transmit digital images and/or videos.

The computing devices 14 may include a user control interface that enables one or more users to share information and commands with the computing devices or server devices 12. The user interface may comprise one or more functionable inputs such as buttons, keyboard, switches, scrolls wheels, voice recognition elements such as a microphone, and pointing devices such as mice, touchpads, tracking balls, and styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the computing device 14.

The communications network 16 may be wired or wireless and may include servers, routers, switches, wireless receivers and transmitters, and the like, as well as electrically conductive cables or optical cables. The communications network 16 may also include local, metro, or wide area networks, as well as the Internet, or other cloud networks. Furthermore, the communications network 16 may include cellular or mobile phone networks, as well as landline phone networks, public switched telephone networks, fiber optic networks, or the like.

Both the server devices 12 and the computing devices 14 may be connected to the communications network 16. Server devices 12 may be able to communicate with other server devices 12 or computing devices 14 through the communications network 16. Likewise, computing devices 14 may be able to communicate with other computing devices 14 or server devices 12 through the communications network 16. The connection to the communications network 16 may be wired or wireless. Thus, the server devices 12 and the computing devices 14 may include the appropriate components to establish a wired or a wireless connection.

The computer program of the present invention may run on computing devices 14 or, alternatively, may run on one or more server devices 12. Thus, a first portion of the program, code, or instructions may execute on a first server device 12 or a first computing device 14, while a second portion of the program, code, or instructions may execute on a second server device 12 or a second computing device 14. In some embodiments, other portions of the program, code, or instructions may execute on other server devices 12 as well. For example, information particular to each user may be stored on a memory element associated with the server device 12, such that the information particular to each user is remotely accessible to a user, an administrator, or a brand owner using the computer program via one or more computing devices 14. In additional embodiments of the invention, a portion of the information to implement the present invention may be stored on the server device 12, while another portion may be stored on the one or more computing devices 14. The various actions, analyses, and calculations described herein as being performed by or using the computer program may actually be performed by one or more computers, processors, or other computational devices, such as the computing devices 14 and/or server devices 12, independently or cooperatively executing portions of the computer program.

In certain embodiments of the invention, the computer program may be embodied in a stand-alone program downloaded on a user's computing device 14 or in a web-accessible program that is accessible by the user's computing device 14 via the network 16. For the stand-alone program, a downloadable version of the computer program may be stored, at least in part, on the server device 12. A user can download at least a portion of the computer program onto the computing device 14 via the network 16. In such embodiments of the present invention, the computer program may be an "application," such as an "app" for a mobile device. After the computer program has been downloaded, the program can be installed on the computing device 14 in an executable format. The executable form of the program permits the user to access embodiments of the present invention via an electronic resource, such as a mobile "app" or website. For the web-accessible computer program, the user may simply access the computer program via the network 16 (e.g., the Internet) with the computing device 14.

Types of User Accounts

Once the user has access to the electronic resource, via the computer program installed on a user's computing device 14 or the web, certain embodiments may provide for various types of users to create accounts with which to access the electronic resource. The user accounts may be stored within the memory elements of the server 16 or in the respective databases. Certain embodiments of the present invention may provide for at least three types of user accounts, including a user account for a user who will purchase products or services at the electronic resource, an administrator account for an administrator of the electronic resource, and a brand owner account for a company that provides products or services available for purchase at the electronic resource. Each user account may provide users with unique roles, capabilities, and permissions with respect to implementing embodiments of the invention. However, such embodiments are provided for exemplary purposes only, and other embodiments of the invention may include any number and/or any specific types of accounts as may be necessary to carry out the functions, features, and/or implementations of the invention. For instance, certain other embodiments may provide for a role-based security feature, such that administrative users (i.e., the administrator), through their administrative accounts, may establish, maintain, and oversee a plurality of different types of accounts. Thus, the administrative users may establish and manage the roles, capabilities, and permissions of each of the different types of accounts.

Returning to the embodiments detailed above with three types of user accounts, the user account is an account created by or for the user desiring to access the electronic resource to participate in the purchase and play activities available at the resource. The user may establish a user account, and via such account enter user information necessary for the administrator to administer the account. Such user information may include a user name with which the user can log-in to the resource; a password or other authentication measure; an e-mail address or social media tag; a home address or shipping address; financial information, such as a debit or credit card that can be used to make purchases at the resource; a qualification level of the user, as described in more detail below; a preferred currency by which the user desires to pay (e.g., if the user is located in the United States, then the computer program automatically defaults to the U.S. dollar as the preferred tender but allows the user an option of selecting a different currency); and a currency amount representing a number of promotional-valued credits held by the user. As such, the user may enter personal information (name, age, address, social security number, banking information, etc.).

The administrator account is established by or for the administrator of the electronic resource. The administrator is a host of the electronic resource, and the host may be an entity or person. The administrator may access the account to review information particular to a user, to assign or otherwise adjust an amount of promotional-valued credits received for purchase of a particular product or service or play of a game, and to perform other administrative functions and actions for maintaining the electronic resource. As such, the administrator may be able to access some or all of the user accounts or, at the least, access data entered or stored on behalf of the user.

The brand owner account is for brand owners, i.e., companies or persons that are providing products or services available for purchase at the electronic resource. For example, a brand owner may be a big-box retailer that is providing a stored value card, i.e., a merchant gift card, that can be purchased by the user and used to purchase items at the big-box retailer. Alternatively, a brand owner can be a provider of services, such as a car mechanic who provides an oil change, or a salon that provides a hair cut. Via the brand owner account, the brand owner can upload various products or services that the brand owner is willing to supply. The brand owner may also be able to obtain statistical, historical, and demographic information regarding user behavior and purchase of the brand owner's products or services.

In embodiments of the invention, the administrator and brand owner may enter into strategic business relationships, whereby the administrator purchases the brand owner's products or services from the brand owner and in turn resells them to users via the electronic resource. In embodiments and as discussed in more detail below, the administrator may purchase the brand owner's products or services at a discounted cost relative to the fair market value of the product or service. As a non-limiting example, the administrator may purchase a $100 gift card issued by the brand owner (e.g., a big-box retailer) at a 10% discount, such that the administrator is paying $90 for the gift card having $100 in spending value.

Although certain details and descriptions provided below discuss certain functions, features, and/or implementations of the invention being carried out by a particular type of user or user account, it is hereby understood that such descriptions are simply provided for illustrative purposes. Thus, for example, certain functions described below as being performed by a user may likewise be performed by an administrator, and such is similarly applicable to other types of users and user accounts as may be required.

Regardless of the type of user account created, each user with an account may be required to enter, or have entered, various pieces of identification information, such as email address and name. In addition, the user may be required to enter or will otherwise be provided with a username and password, which may be required for the user to log-in to the user's account and access the electronic resource. All information entered by the user is received, via the network 16, and may be stored on the server device 12 or respective database.

Although certain embodiments of the present invention may require a user to establish an account, certain other embodiments may provide for features of the invention to be utilized, such as browsing products or services offerings or playing a game, without requiring the establishment of a user account.

Method and Computer Program Description

Figure 3:
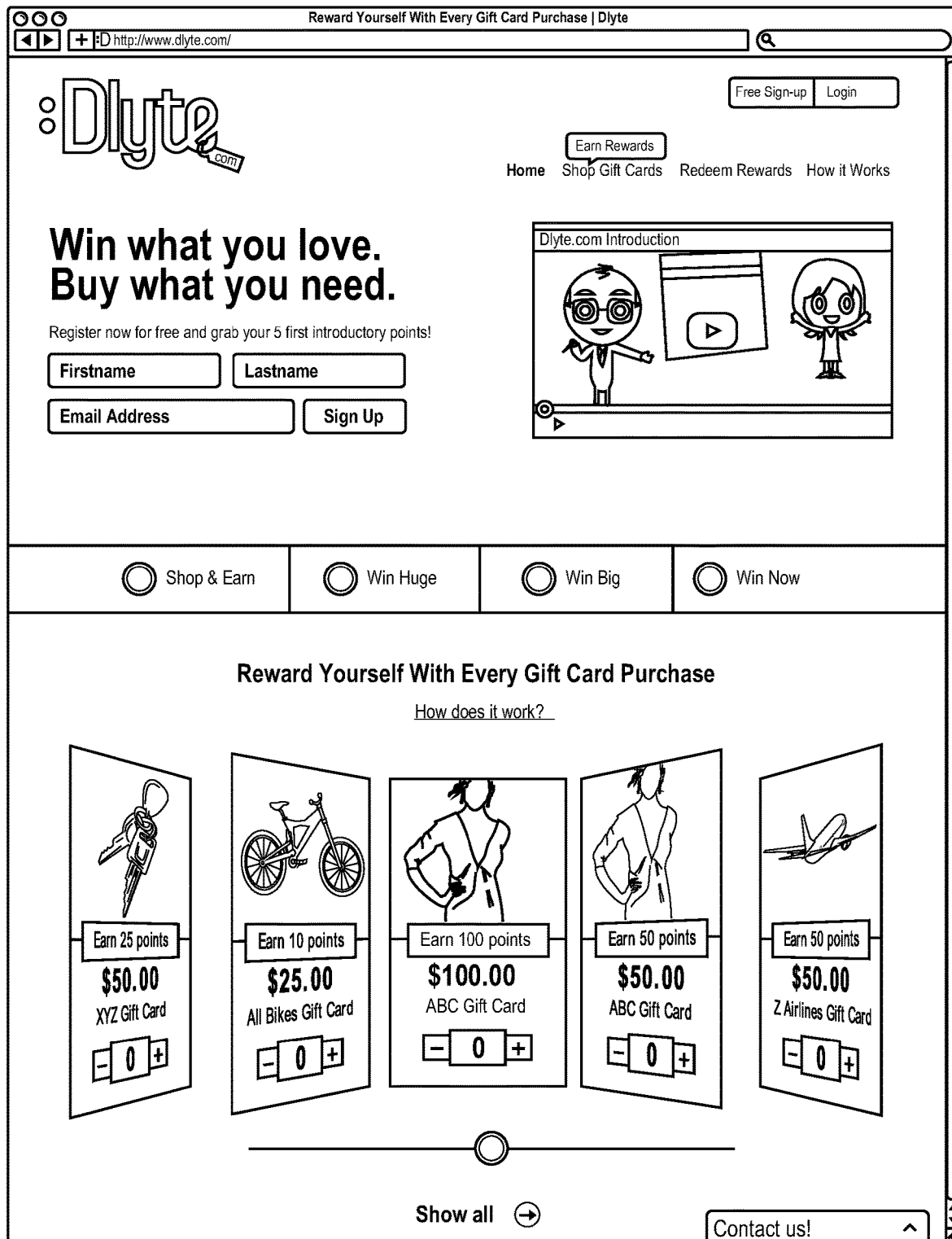
FIG. 3 is a first screen capture of the computer program of embodiments of the invention.

Referring now to the flowchart of FIG. 1, the method and computer program of embodiments of the invention provide the electronic resource to the user, as shown in Step 100 and as illustrated in the screen capture of FIG. 3. As noted above, the electronic resource may be a website available online and via the Internet. Alternatively, the electronic resource may be a mobile application or a stand-alone computer program downloadable to a user's computing device. The electronic resource provides various modules or segments whereby the user can perform the activities or functions of the invention.

As shown in Step 102 of FIG. 1, a first module is a user account module where the user can input the user information, as discussed above for the user account, such that the electronic resource receives the user information from the user, and the user information is associated with the user's account accessible at the electronic resource. The user account module provides a data entry page having a plurality of fields or other data-entry methods for receiving the user information. Additionally, the user account maintains a record of the user's purchases and a current balance of the user's promotional-valued credits (also referred to as a virtual wallet). The user can access, via the electronic resource, their user information, including the current balance of promotional-valued credits associated with the user's account and held in the virtual wallet. The user can also fund their account by paying for additional promotional-valued credits or being credited promotional-valued credits for performing certain actions, such as referring a friend to the resource or liking the resource on a social media site. The user also can receive promotional-valued credits by mailing to the administrator a self-addressed stamped postcard requesting the credits. In embodiments, upon a user initially establishing an account at the electronic resource, the user may receive an initial amount of promotional-valued credits to fund the user's account.

The user may also select, via their account, one or more types of products or services of interest to the user (e.g., merchant gift cards, spa services, restaurants, etc.) and one or more types of games the user prefers to play. To expedite selection of preferred products, services, and games, the electronic resource may present a plurality of filters that the user can select or deselect to indicate their preferences. Additionally, embodiments of the invention may learn the user's purchase and game-playing behaviors over time and present to the user products or services or games that may be of interest to the user.

As noted above, embodiments of the invention encompass the sale of both products and services. Types of products include tangible items, such as a lamp or kitchen appliances, along with stored value products, such as prepaid cards, gift cards, coupons, rebates, virtual gift cards, or the like, which are redeemable for products sold by the brand owner. The stored value products may be offered by specific brand owners and may be redeemable at the brand owner's brick and mortar retail locations, catalog direct mail, or online.

The electronic resource includes various search functions that permit the user to search for products or service based on criteria such as keyword, specified brand owner or vendor, monetary value, a stored value product type (e.g., gift card, coupon, etc.), or the like. Once the user has identified a product or service for purchase, the electronic resource includes an online check-out system whereby the user can purchase the product or service via a credit card or online payment service, such as Paypal®, PayNearMe®, Dwolla®, or the like, and/or debiting of the user's virtual wallet associated with the user account. In certain embodiments, the payment may be provided to the administrator of the electronic resource. In such an embodiment, the administrator may be required to pass on the payment to the brand owner that offered and supplied the product or service. Alternatively, in embodiments where the administrator previously purchased the product or service from the brand owner, the administrator may simply use the payment to recoup the costs initially expended. In even further embodiments, the payments may be provided directly to the brand owner that offered and supplied the product or service.

Embodiments of the invention provide an ecommerce platform by which products or services can be purchased using a currency. The invention contemplates different types of currencies being used to purchase the products or services. In a first instance, a fiat currency is used to purchase a product or service. A fiat currency is herein defined as a government-issued currency that is legal tender, such as the U.S. dollar or European Union euro. In a second instance, each promotional-valued credit (PVC) is a type of virtual currency that the user may use to purchase the product or service. Thus, the PVCs have a set purchasing value within the environment of the ecommerce platform. In embodiments of the invention, the fiat currency for the governmental jurisdiction in which the user is playing has a one-to-one (1:1) value to each PVC. As an example, if the user is a U.S.-based user, then each PVC has a value of $1.00. In other embodiments, the ratio of fiat currency to PVCs may be 10:1, 5:1, 4:1, 3:1, or 2:1. For clarity, a 10:1 ratio of fiat currency to PVCs means that if the product or service costs $100 to purchase, then the user will receive 10 PVCs. As another example, if the ratio of fiat currency to PVCs is 2:1, and the product or service costs $100, then the user will receive 50 PVCs. In alternative embodiments, the ratio of fiat currency to PVCs may be 1:10, 1:5, 1:4, 1:3, or 1:2. If the ratio is 1:10, then a $100 product or service is awarded 1000 PVCs. Although the PVCs are referred to as "credits," it should be appreciated that the PVCs may be referred to by different nomenclature, such as dollars, points, or a trademark name. In alternative embodiments of the invention, a user may purchase products or services with digital currency, such as Bitcoin™.

Figure 4:
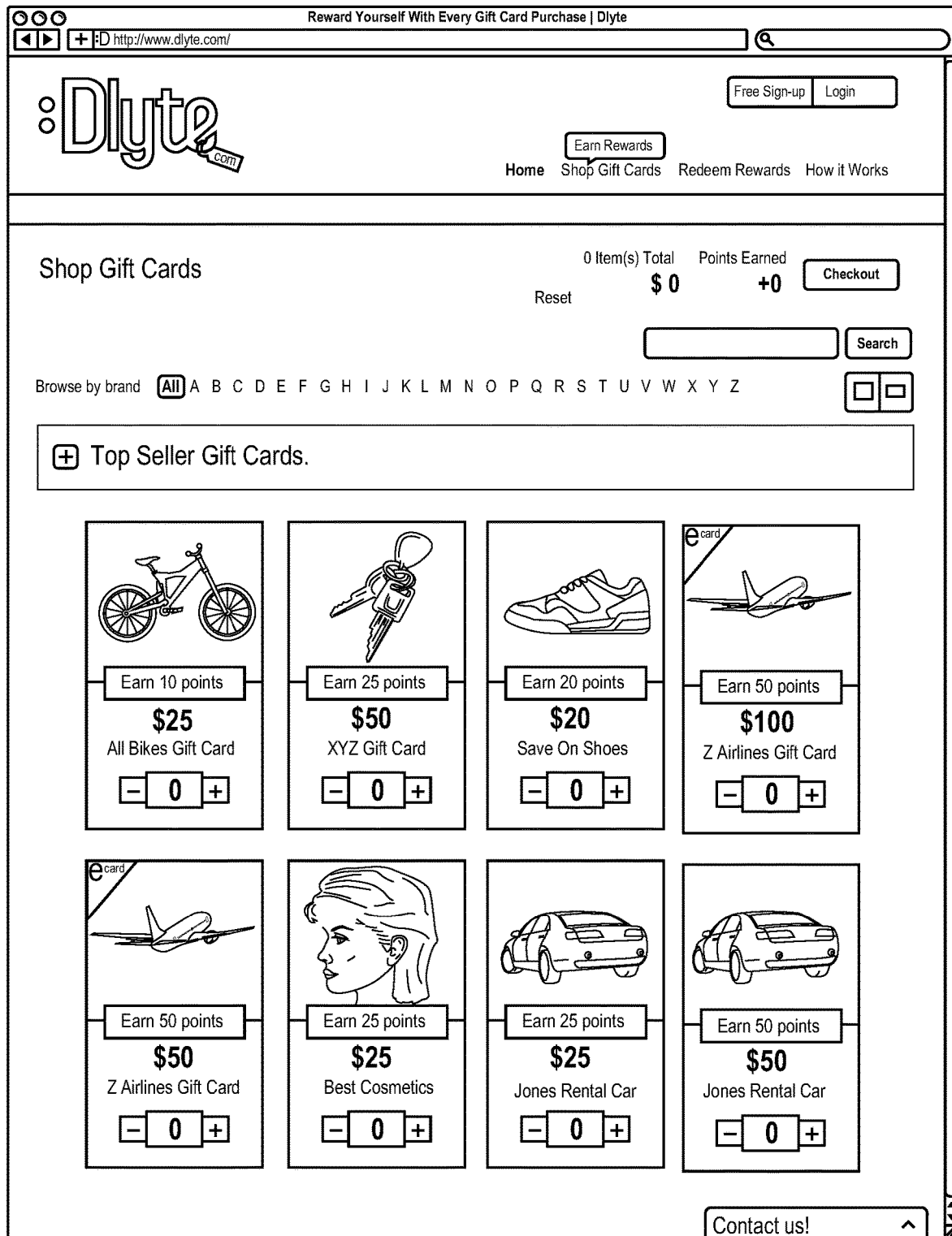
FIG. 4 is a second screen capture of the computer program of embodiments of the invention.

A second module provided by the electronic resource is a purchase module, whereby the user can purchase the product or service. The purchase module presents to the user and via the electronic resource at least one product or service available for purchase, as shown in Step 104 and as illustrated in FIG. 4. As noted above, the purchase module may present select products or services based on the user's previously-identified interests or past purchase behavior.

Each product or service has an associated cost to purchase. In embodiments, a purchase amount for the product or service representing the cost to purchase the product or service is less than or equal to a fair market value for the product or service. A fair market value is a price an average consumer would pay, outside of the present ecommerce platform, in an arm's length transaction for the product or service and without the benefit of a coupon, discounted pricing based on user characteristics (e.g., high-volume user), etc.

In some embodiments of the invention, the cost to purchase may be identified by a fiat currency only, i.e., the product or service can only be purchased with payment in the fiat currency. Alternatively, the product or service may be identified by the PVC only, i.e., the product or service can only be purchased by redeeming PVCs. In yet a further alternative, the product or service may be identified as being available for purchase with a combination of fiat currency and PVCs. In such an instance, the computer program of the invention may list a pre-set amount of fiat currency and PVCs the user must pay for the product or service. In some instances, the amount of fiat currency may be the same as the amount the administrator paid to the brand owner for the product or service, such that the administrator is guaranteed to cover its costs in the sale of the product or service. Alternatively, the amount of fiat currency may be more than the administrator paid to the brand owner for the product or service, but less than or equal to the fair market value of the product or service. For example, if the product is a stored value card loaded with $100 and the administrator paid the brand owner $90 for the card, then the administrator may be willing to sell the card to a user for $95. The user receives a 5% discount on the cost of the stored valued card, and the administrator makes $5 on the sale of the product or service. In yet a further alternative, the amount of fiat currency may be less than the amount paid by the administrator to the brand owner for the product or service but within a pre-set percentage of such amount, such as within 20%, within 15%, within 10%, within 5%, or within 2%. As a non-limiting example, the administrator may be selling a stored valued card loaded with $100 and the administrator paid the brand owner $90 for the card. The administrator may be willing to sell the stored value card to a user for $85 if the user is a high-volume user of the ecommerce platform or as an incentive to the user to purchase and play via the invention. The above examples do not take into consideration shipping and handling costs associated with delivering the product or service to the user.

In an embodiment where the user may purchase the product or service with a combination of fiat currency and PVCs, an alternative is that the computer program requests the user input how many PVCs the user is willing to or has available for payment of the product or service. This is in contrast to the above-described pre-set amount of fiat currency and PVCs to be paid for the product or service. The computer program will then calculate, based on the inputted PVCs, a remaining cost to purchase using the fiat currency. In one embodiment, the calculated remaining cost to purchase using fiat currency may be based on the pre-set value of the PVCs. For example, if the product or service costs $100, the user is willing to pay 25 PVCs, and the ratio of fiat currency to PVCs is 1:1, then the remaining amount of fiat currency to be paid is $75. In another embodiment, the calculated remaining cost to purchase using fiat currency may be based on an amount paid by the administrator to the brand owner for the product or service and a percentage amount the administrator desires to make on the sale of the product or service. For example, if the administrator purchased the product or service from the brand owner at a discount of 10% (e.g., the $100 stored valued card purchased by the administrator for $90), then the administrator may be willing to sell the product or service to the user at an amount of fiat currency less than what the administrator paid for the product or service (e.g., $90), but within a particular percentage amount (e.g., within 10%) of the amount paid by the administrator (e.g., the administrator would sell the card for $81, as 10% of $90 is $9). The user would then pay for the remaining value of the product or service using the PVCs. In one embodiment, the product or service valued at $100, for example, may be advertised by the electronic resource as being for sale for $100. Keeping with the above example, the user would pay $81 in fiat currency for the $100 card and PVCs equal to $19 (depending on the PVC to dollar ratio discussed above). Alternatively, the product or service valued at $100 may be advertised by the electronic resource as being for sale for $90. The user would then pay $81 in fiat currency for the $100 card but only PVCs equal to $9 (again, depending on the PVC to dollar ratio discussed above). As discussed in more detail below, in instances where the administrator is receiving payment from the user in fiat currency that is less than the amount paid by the administrator to the brand owner, the administrator may still be generating a small profit because the user is paying the remaining amount using the PVCs. Because the PVCs are a virtual currency that are earned and used within the environment of the ecommerce platform, the administrator can still earn small profits, e.g., less than 2%, off a transaction while still providing a much larger discount to the user.

In embodiments of the invention, if the user is a first-time user, i.e., the user has never previously purchased a product or service at the electronic resource, then the user may be limited to purchasing a first or initial product or service with fiat currency only. This limitation may be implemented to insure that the administrator does not lose money on the first-time user's first purchase should the user not purchase additional products or services in the future or play any games available at the electronic resource, as discussed below.

In embodiments of the invention, a universal set of products or services is available for purchase. In some embodiments, the universal set of products or services is available to all users at all times, i.e., a first-time user to the electronic resource can purchase any product or service. In other embodiments, only a subset of the universal set of products or services is available for purchase for first-time users to the electronic resource. Alternatively, it may be that only a subset of the universal set of products or services is available for purchase using PVCs (the product or service can be purchased with some or all PVCs), and such implementation may be for both first-time users and multi-use users.

Figure 7:
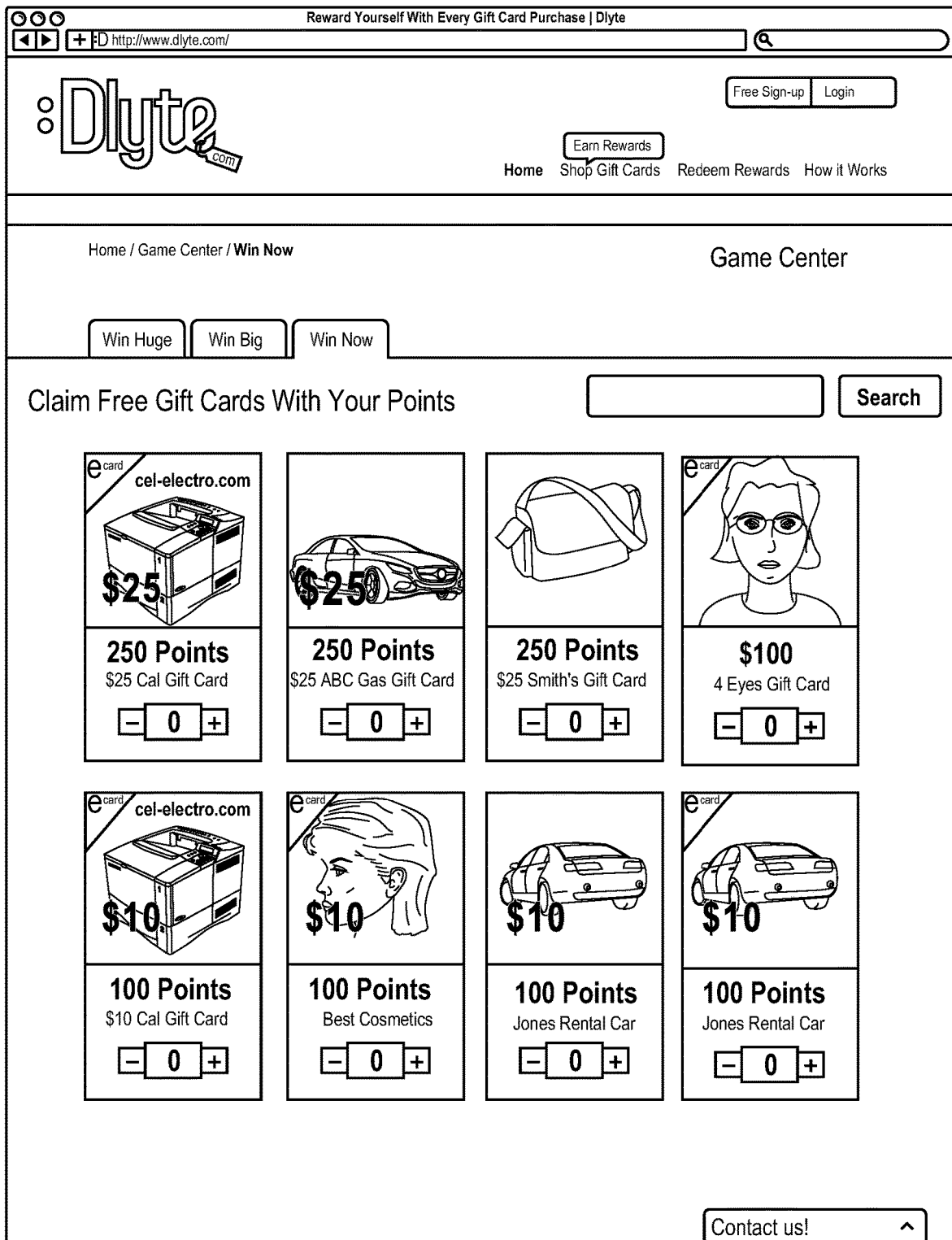
FIG. 7 is a fifth screen capture of the computer program of embodiments of the invention.

In yet further embodiments, and as shown when comparing FIGS. 4 and 7, a first set of the products or services may only be available for purchase using fiat currency. The user may then be awarded a set amount of PVCs, as discussed herein. The user may then redeem the PVCs for a product or service in a second set. Thus, some products and services may only be available for purchase using fiat currency, while other products or services may only be available for purchase by redeeming PVCs.

In embodiments of the invention, the administrator may offer the user a further discount if the user is a high-volume user or as an incentive to make a purchase, as discussed above. Moreover, the administrator may offer coupons for particular products or services, short-term discounts, and other methods for incentivizing purchase.

The purchase module of embodiments of the invention further includes providing an award amount to the user representing an award for purchasing the product or service, as shown in FIG. 4. Thus, in some embodiments of the invention, a purchase of a good or service results in the user receiving an award in the form of PVCs, such that the award amount corresponds to an amount of PVCs awarded to the user. In embodiments, the electronic resource identifies the award amount prior to the user completing the purchase. In other embodiments, the user is not informed of the award amount until after the user completes the purchase. The PVCs earned as the award amount are credited to the user's account and can be used by the user for either or both of purchasing additional products or services (or, at the least, to pay a portion of the cost of the product or service) or playing games available at the electronic resource.

The award amount for the purchase of a particular good or service may be dependent on several factors, including characteristics of the user purchasing the product or service, a desired profit by the administrator, a threshold incentivizing amount that will incentivize users to purchase and play but not otherwise result in a lost profit to the administrator, a popularity of a particular product or service (e.g., stored value cards for a well-known big-box retailer may have less of an award amount than a service provided by a small business); and processing and handling costs for the purchased product or service. Exemplary characteristics of the user that may be a factor for the award amount include a volume or frequency of purchase and play for the user; a length of time the user has been using the ecommerce platform or otherwise accessing the electronic resource (e.g., long-time users may be given a higher award amount than short-time users or vice-versa); and a qualification level of the user. It should thus be appreciated that the award amount for a particular product or service may vary for different users. In yet further embodiments, purchase of a product or service may have an award amount of no PVCs.

Referring again to FIG. 1, in Step 106, the computer program and method receives the user's selection of at least one product or service that the user desires to purchase. At Step 108, the user is awarded the award amount representing the award provided to the user for purchasing the product or service. The award amount is credited to the user's account.

Referring to FIG. 1 and Step 110, a third module presented by the electronic resource is a play module, whereby the user is provided, via the electronic resource, at least one game that the user may play. In embodiments of the invention, a plurality of games is available for play. In some embodiments, play of the game requires a payment by the user of either fiat currency or at least one PVC. As set forth in Step 112, the user is then allowed to play the game in exchange for the user providing the set amount of PVCs to play the game (i.e., the user's account being debited the PVC amount to play the game). In other embodiments, the user may play the game for free.

In embodiments of the invention, play of the game produces an outcome. For skill-based games, the outcome may be dependent on how well the user played the game. For games of chance, the outcome is dependent on chance. As can be appreciated, some games are a combination of skill and chance. As set forth in Step 114, the user is awarded an amount of PVCs based on the outcome of the user's play of the game, wherein the awarded amount may be a negative PVC, zero PVC, or a positive PVC, as described below. The user's account may then be debited or credited with PVCs depending on the net difference between the amount of PVCs paid to play the game and the amount of PVCs awarded based on the outcome of the game. The amount of PVCs to play the game may be less than the awarded amount, the same as the awarded amount, or more than the awarded amount.

For some embodiments, the user may have a net loss of PVCs based on the amount paid to play the game and the outcome of the game. Such may occur if the user is awarded positive PVCs based on the outcome of the game but the awarded PVCs are less than the PVCs paid to play the game, or if the user is awarded zero or negative PVCs based on the outcome of the game. In such an instance, the user's account will be debited with the net loss of PVCs (i.e., the difference between the amount the user paid to play the game and the amount awarded to the user based on the outcome of the game). Thus, it should be appreciated that the outcome of the game may result in the user winning at least one PVC but still result in a net loss based on the amount the user paid to play the game. In other embodiments, play of the game may be administered so that the user is guaranteed not to lose any PVCs based on the difference between the amount paid to play the game and the amount received based on the outcome of the game. In yet further embodiments, the user may win PVCs (i.e., have a net gain) between the amount paid to play the game and the amount received based on the outcome of the game. In each instance, the user is awarded an amount of PVCs based on the outcome of the game, but it should be appreciated that depending on said outcome, an amount of PVCs debited or credited to the user's account may be a negative amount, zero, or a positive amount of PVCs. In embodiments where the user does not pay to play the game, the user is not eligible to receive any PVCs, such that the user is guaranteed not to lose or win any PVCs.

In embodiments of the invention, play of the game includes a maximum amount that the user can lose (i.e., a maximum net loss) based on the amount paid to play the game and an amount awarded based on the outcome of the game. For example, the electronic resource may present or otherwise list, in association with the game, a maximum potential loss for play of the game. The user can then take the maximum potential loss into consideration in choosing to play the game.

After the user's account has been debited or credited (as the case may be) with PVCs, the user may subsequently use the PVCs in their account to purchase additional products or services or play additional games, as illustrated in FIG. 7. The above-described steps may then be repeated, whereby the user makes a purchase, receives an award amount of PVCs for the purchase, and then subsequently uses the PVCs in the user's account to purchase yet additional products or services or play additional games. In embodiments of the invention, the electronic resource may be divided into product or services that can only be purchased with fiat currency, such as shown in FIG. 4, and products or services that can only be purchased with PVCs (i.e., the PVCs may be redeemed for the products or services), such as shown in FIG. 7.

Types of Games and Activities

As discussed above, the user may participate in or otherwise play games available at the electronic resource. Reference to "games" herein is intended to include various types of events or activities, such as auctions. In auctions, the user may use PVCs to take part in an online auction, whereby the winner of the auction receives an auctioned product or service and/or a pre-set amount of PVCs. Although embodiments of the invention broadly contemplate the use of many auction types, two specific auction types, namely penny auctions and reverse auctions, will be discussed in more detail below.

Figure 5:
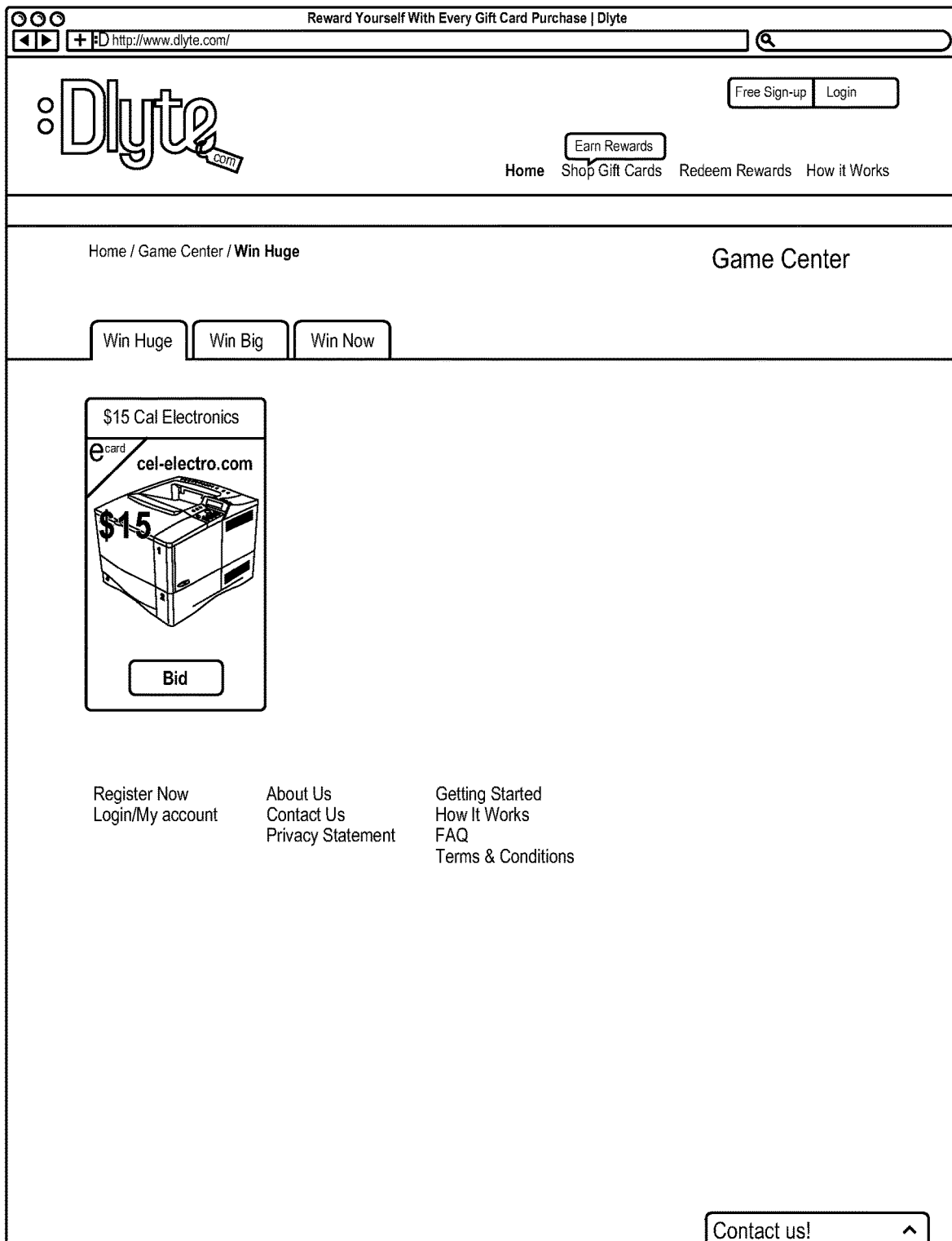
FIG. 5 is a third screen capture of the computer program of embodiments of the invention.

Referring now to FIG. 5, in a penny auction the user uses its PVCs to place a bid on a product or service. Each bid increments the auction price of the product or service by one penny ($0.01), and the closing price of the auction is determined based on the total number of bids made when an auction time clock has fully elapsed. For instance, in bidding for a $100 gift card, if during the course of the auction one thousand bids were made, then the closing price of the product or service would be ten dollars ($10). Thus, a user that made the one-thousandth bid, and the clock elapsed with no further bids, wins the auction and purchases the stored value product ($100 value) at the auction's closing price, in this case $10.00. However, at no time are any monetary funds of the user lost or put at risk during the bidding of the auction. The winning bidder is required to pay the closing price of the auction and a nominal fulfillment charge in order to close the auction and receive the product or service they won.

Figure 6:
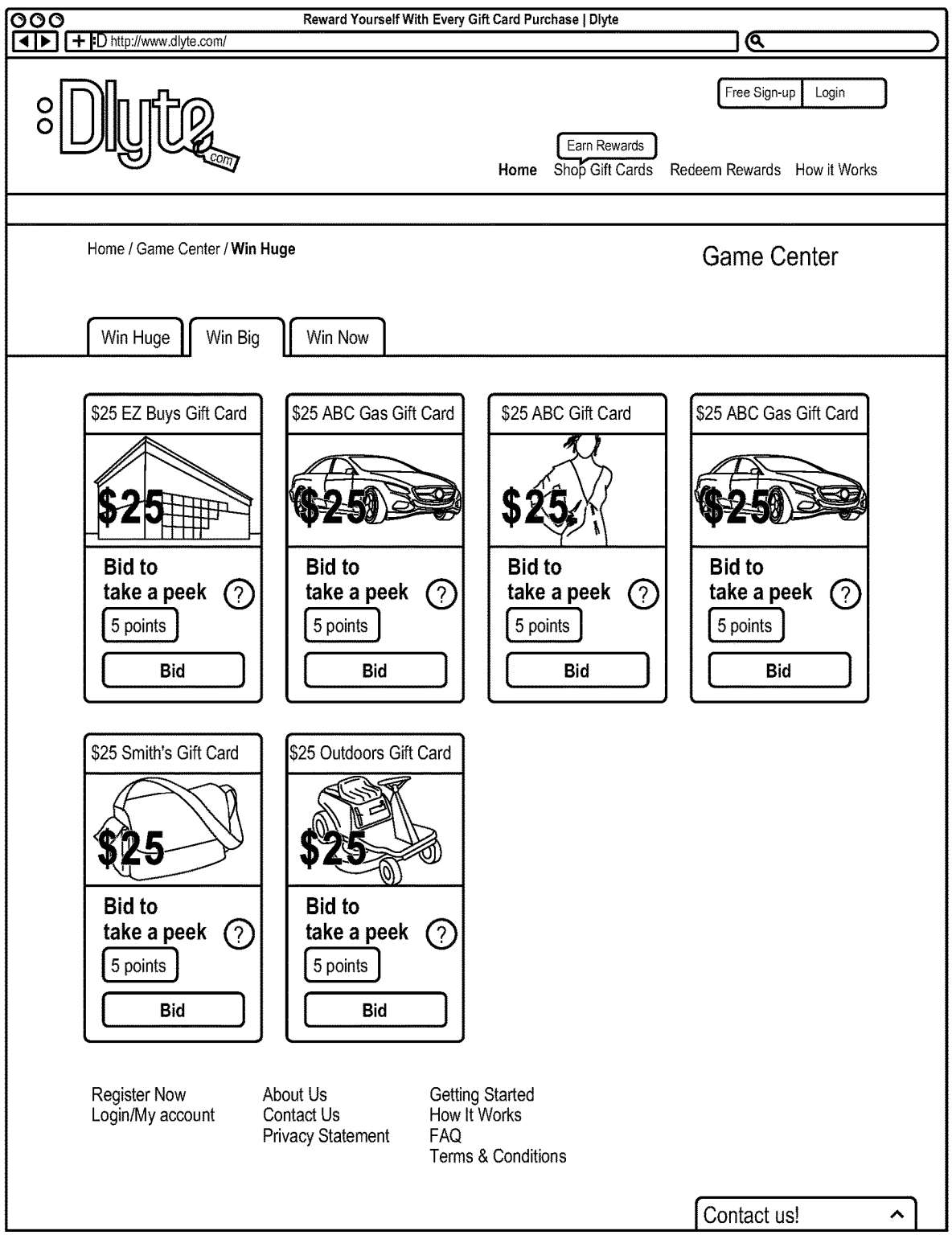
FIG. 6 is a fourth screen capture of the computer program of embodiments of the invention.

Referring to FIG. 6, in a reverse auction, a user bids their PVCs to decrement the auction price of the product or service. Each PVC bid reduces the price of the product or service by a specified amount (e.g., each PVC reduces the price by $0.05). In addition, after the user makes a bid, the current auction price is made viewable to the user, and the user is given an allotted amount of time to purchase the product or service at the current auction price. As an example, a gift card valued at $50.00 is auctioned in a reverse auction. A user bids five PVCs, which reduces the auction price by twenty-five cents (i.e., to $49.75). The current auction price of $49.75 is made viewable to the user, and the user is given ten seconds to purchase the gift card. If the user chooses to purchase the gift card for $49.75, then the user has won the auction. If the user chooses not to purchase the gift card, then the auction continues and the current bid price is obfuscated once more. In such a reverse auction, the winner of the auction is the user who, at the time when the auction price was revealed, decides to buy the gift card at the current auction price. Thus, in reverse auctions, after the user has made a bid, he/she has the exclusive choice for the allotted time to decide whether or not to buy the stored value product at the then current auction price. However, at no time are any monetary funds (i.e., fiat currency) of the user lost or put at risk during the bidding process. Alternatively stated, at no time is the user's net return on the amount of fiat currency "paid-in" to the electronic resource less than the fair market value of the products or services purchased via the electronic resource. Moreover, as can be appreciated, in most instances, the amount of fiat currency "paid-in" to the electronic resource will be less than the fair market value of the products or services purchased via the electronic resource.

As the auctions are being conducted, the online resource may present a live bidding screen that lists the present and past bidding activity for each auction currently being conducted. In addition, users with a user account may personalize the live bidding screen, such that the screen lists only bidding activity for those auctions in which the user is currently participating. The above-listed auction types are provided for illustrative purposes only. Embodiments of the invention contemplate the use of any type of auction known in the art.

In addition to auctions, the user may use PVCs to participate in games that provide the chance for the user to obtain prizes, such as products or services and/or additional PVCs. In certain embodiments of the invention and as briefly noted above, the games may include outcomes that are uncertain. Such games may include chance casino-type games, including bingo, roulette, keno, or the like. In such an embodiment, users can wager PVCs that the game will end in a particular outcome. In addition, however, other games may be included, such as puzzle games, strategy games, or adventure games. Upon winning a game, the user may be entitled to receive either a product or service or a prize amount of PVCs. In such an embodiment, the administrator of the electronic resource may list the odds or prize return value for the game. The odds or return value may correspond to the amount of PVCs required to be paid to play the game versus either (1) the fair market value of the product or service prize, (2) a magnitude of a prize multiple value that is applied to the wager, (3) a difficulty of the game, or (4) some other criteria determined by the administrator. In addition, the administrator can determine or modify any rules of the game. For instance, the administrator may potentially determine that up to five users may participate in any one game, or the administrator may restrict the number of PVCs that may be wagered on any one game. However, such rules are provided for exemplary purposes only, and the administrator may determine or modify any rules as necessary for running the games. Upon winning or losing PVCs, such win/loss amounts will be debited or credited to the user's virtual wallet, as described above. However, at no time are any monetary funds of the user lost or put at risk when participating in PVC redemption actions through the various games and activities available at the electronic resource.

Embodiments of the invention additionally include the use of competitive-type games, including skill-based games, such as chess, checkers, dominoes, poker, or the like. In such games, users may play against other users in attempts to earn additional PVCs. For instance, in a poker game, a user may buy-in for 100 PVCs. In exchange for the 100 PVCs, the user may be given 2000 virtual poker tokens. Once the user has obtained the virtual poker tokens, the user can play against other users in various games of poker. Remaining with the above-example, if after one week of playing the poker games the user has obtained 20,000 virtual poker tokens, then the user can cash-in the virtual poker tokens for PVCs and use the PVCs to in turn purchase products or services. Thus, for example, the user could exchange the 20,000 virtual poker tokens for 1,000 PVCs, which are credited to the user's virtual wallet. However, at no time are any monetary funds of the user lost or put at risk.

It is noted that although the user may play games via embodiments of the invention, the user need not play games to otherwise earn PVCs or purchase products or services via the electronic resource. In particular, in some embodiments, a user may not play games whatsoever, should it choose such. However, as discussed above, because the purchase of a product or service results in an award of an amount of PVCs, the user can use the awarded PVCs to in turn purchase additional products or services. For at least some of the products or services, the user will likely need to supplement the purchase with fiat currency (e.g., purchase the product or service with a combination of PVCs and fiat currency). However, at no time is the user's net return on the amount of fiat currency "paid-in" to the electronic resource less than the fair market value of the products or services purchased via the electronic resource.

Embodiments of the invention further provide for reports to be generated for the use of both the user and the administrator. As an example, the user may generate and display via the electronic resource a report that is an activity summary of the user's past activity (either for all time or for a particular time period). For instance, the summary may include a listing of the user's personal information, the amount of PVCs currently in the user's virtual wallet, or other pertinent information. In addition, the summary page may provide a summary of all online games previously completed or currently being participated in by the user. For instance, the summary page may display each of the previous auctions that the user participated in and the results of each of said auctions. In addition, the summary page may display the user's previously completed games and the results of each of said games.

In addition to earning PVCs through purchasing products and services, embodiments of the invention may provide for users to obtain PVCs through participating in promotional advertisements presented via the electronic resource. Such promotional advertisements may be sponsored by the administrator or by brand owners who offer PVCs in exchange for an opportunity to display the promotional advertisements. In certain embodiments of the invention, the user may choose to participate in a promotional advertisement by selecting an advertisement link displayed on the electronic resource. Advertisement links may be displayed anytime the user is logged on to the electronic resource. For instance, the advertisement links may be displayed as the user is searching for and purchasing products or services, or the links may be displayed while the user is participating in online games. In addition, the administrator may otherwise communicate with the users via email, instant messaging, social media, or the like to offer products and services. Once the user has selected an advertisement link, the user may be provided with at least one of a plurality of advertisement promotions, including textual/graphic advertisements, video advertisements, interactive advertisements, or the like. In addition, the advertising promotion may require the user to complete a task, such as signing up on a mailing list for a brand owner, completing a survey, or purchasing a product or service. Once the user has participated in the advertising promotion, the user's wallet is credited with the amount of PVCs that corresponds to the advertising promotion.

Reference has been made herein to a user qualification level. In embodiments of the invention, certain features of the invention may be dependent on the user's qualification level. In turn, the user's qualification level may be dependent on characteristics of the user, such as a volume or frequency of purchase and play for the user; a length of time the user has been using the ecommerce platform or otherwise accessing the electronic resource (e.g., long-time users may be given a higher award amount than short-time users or vice-versa); a monetary amount of products or services purchased by the user; a number of times the user has referred a friend or made a referral via social media sites; and other factors.

Although the invention has been described with reference to the preferred embodiment(s), it is noted that equivalents may be employed and substitutions made herein without departing from the scope of the invention. For example, although the invention has been described as being implemented with an electronic resource, embodiments of the invention may also be implemented through a brand owner's brick-and-mortar location. The brand owner would then provide, at the retail location, products or services and identify the cost, including the fiat currency cost or the PVC cost. The user account with the brand owner or a third-administrator may track the number of PVCs in the account. The user may play games at the brand owner's retail location and earn additional PVCs, as described herein.

Having thus described various embodiments of the invention, what is claimed as new and desired to be protected by Letters Patent includes the following:

1. A method of providing a commerce platform and an account to a user via an electronic resource comprising a website or a mobile application accessible by the user where the user can make a purchase, receive promotional-valued credits in response to making the purchase, and participate in at least one game, the method comprising the steps of:
presenting, via the electronic resource, a plurality of purchase options available for purchase by the user;
receiving a selection to purchase at least one of the purchase options by the user,
wherein the purchase is associated with a purchase amount representing a cost to purchase at least one of the purchase options using a fiat currency having a fiat currency value;
awarding the user a first amount of promotional-valued credits for making the purchase;
identifying a second amount of promotional-valued credits to initiate play of the at least one game by the user; and
determining a third amount of promotional-valued credits based on the user's play of the at least one game,
wherein the fiat currency value of the account is a net sum of the first amount of promotional-valued credits, the second amount of promotional-valued credits, and the third amount of promotional-valued credits, and wherein the net sum is guaranteed to be equal to or greater than the fiat currency value of the purchase amount associated with the purchase.

2. The method of claim 1, wherein the purchase options and the at least one game are presented to the user based on learned purchase and game-playing behaviors of the user.

3. The method of claim 2, wherein the user may purchase promotional-valued credits using at least one of fiat currency, digital currency, virtual currency, and a combination thereof.

4. The method of claim 3, wherein the promotional-valued credits have a set ratio to the fiat currency.

5. The method of claim 4, wherein the purchase options comprises at least one of a product and a service.

6. The method of claim 5, further comprising the step of receiving user information from the user, wherein the user information is associated with the account for the user accessible at the electronic resource.

7. The method of claim 6, further comprising the step of debiting or crediting the user's account based on a difference between the second amount of promotional-valued credits and the third amount of promotional-valued credits.

8. The method of claim 1, wherein at least one of the purchase options is a stored-value card.

9. The method of claim 1, wherein at least one of the purchase options comprises promotional-valued credits.

10. A non-transitory computer-readable medium having a computer program stored thereon for execution by at least one processor, the computer program operable to provide to a user an electronic resource and an account where the user can make a purchase, receive promotional-valued credits in response to making the purchase, and participate in at least one game, wherein execution of the computer program by the at least one processor performs the following steps:
presenting, via the electronic resource, a plurality of purchase options available for purchase by the user;
receiving a selection to purchase at least one of the purchase options by the user, wherein the purchase is associated with a purchase amount representing a cost to purchase at least one of the purchase options using a fiat currency having a fiat currency value;
awarding the user a first amount of promotional-valued credits for making the purchase;
identifying a second amount of promotional-valued credits to initiate play of the at least one game by the user; and
determining a third amount of promotional-valued credits based on the user's play of the at least one game,
wherein the fiat currency value of the account is a net sum of the first amount of promotional-valued credits, the second amount of promotional-valued credits, and the third amount of promotional-valued credits, and wherein the net sum is guaranteed to be equal to or greater than the fiat currency value of the purchase amount associated with the purchase.

11. The computer-readable medium of claim 10, wherein the first amount of promotional-valued credits awarded to the user for making the purchase is dependent on a plurality of characteristics of the user.

12. The computer-readable medium of claim 11, wherein the of characteristics of the user is at least one of: a length of time the user has been accessing the electronic resource, a frequency with which the user accesses the electronic resource, or a qualification level of the user.

13. The computer-readable medium of claim 12, wherein execution of the computer program by the at least one processor further performs the step of receiving user information from the user, wherein the user information is associated with the account for the user accessible at the electronic resource.

14. The computer-readable medium of claim 13, where execution of the computer program by the at least one processor further performs the step of receiving, via the electronic resource and from the user, if the user's account has a credit after play of the game, either a selection by the user to make another purchase or a selection by the user to play another game at the electronic resource.

15. A system for providing to a user an electronic resource and an account comprising a website or mobile application where the user can make a purchase, receive promotional-valued credits in response to making the purchase, and participate in at least one game, the system comprising:
   a non-transitory computer-readable medium having a computer program stored thereon; and
   at least one processor for execution of the computer program, wherein execution of the computer program by the at least one processor performs the following steps:
      presenting, via the electronic resource, a plurality of purchase options available for purchase by the user;
      receiving a selection to purchase at least one of the purchase options by the user,
      wherein the purchase is associated with a purchase amount representing a cost to purchase at least one of the purchase options using a fiat currency having a fiat currency value;
      awarding the user a first amount of promotional-valued credits for making the purchase;
      identifying a second amount of promotional-valued credits to initiate play of the at least one game by the user; and
      determining a third amount of promotional-valued credits based on the user's play of the at least one game,
      wherein the fiat currency value of the account is a net sum of the first amount of promotional-valued credits, the second amount of promotional-valued credits, and the third amount of promotional-valued credits, and wherein the net sum is guaranteed to be equal to or greater than the fiat currency value of the purchase amount associated with the purchase.

16. The system of claim 15, wherein the promotional-valued credits and the purchase amount of the purchase is accessible by a stored-value card.

17. The system of claim 16, further comprising an advertisement link displayed on the electronic resource, wherein upon a selection of the advertisement link by the user the execution of the computer program by the at least one processor performs an additional step of awarding a fourth amount of promotional-valued credits.

18. The system of claim 17, further comprising a user database for storing user information relating to the account of the user.

19. The system of claim 18, wherein the user database comprises the account of the user, an administrator account, and a brand owner account.

20. The system of claim 18, wherein the user information comprises a current balance of promotional-valued credits associated with the account of the user.

* * * * *